Jan. 26, 1965 P. C. CONSOLETTI 3,167,100
SAW CHAIN
Filed Oct. 11, 1962
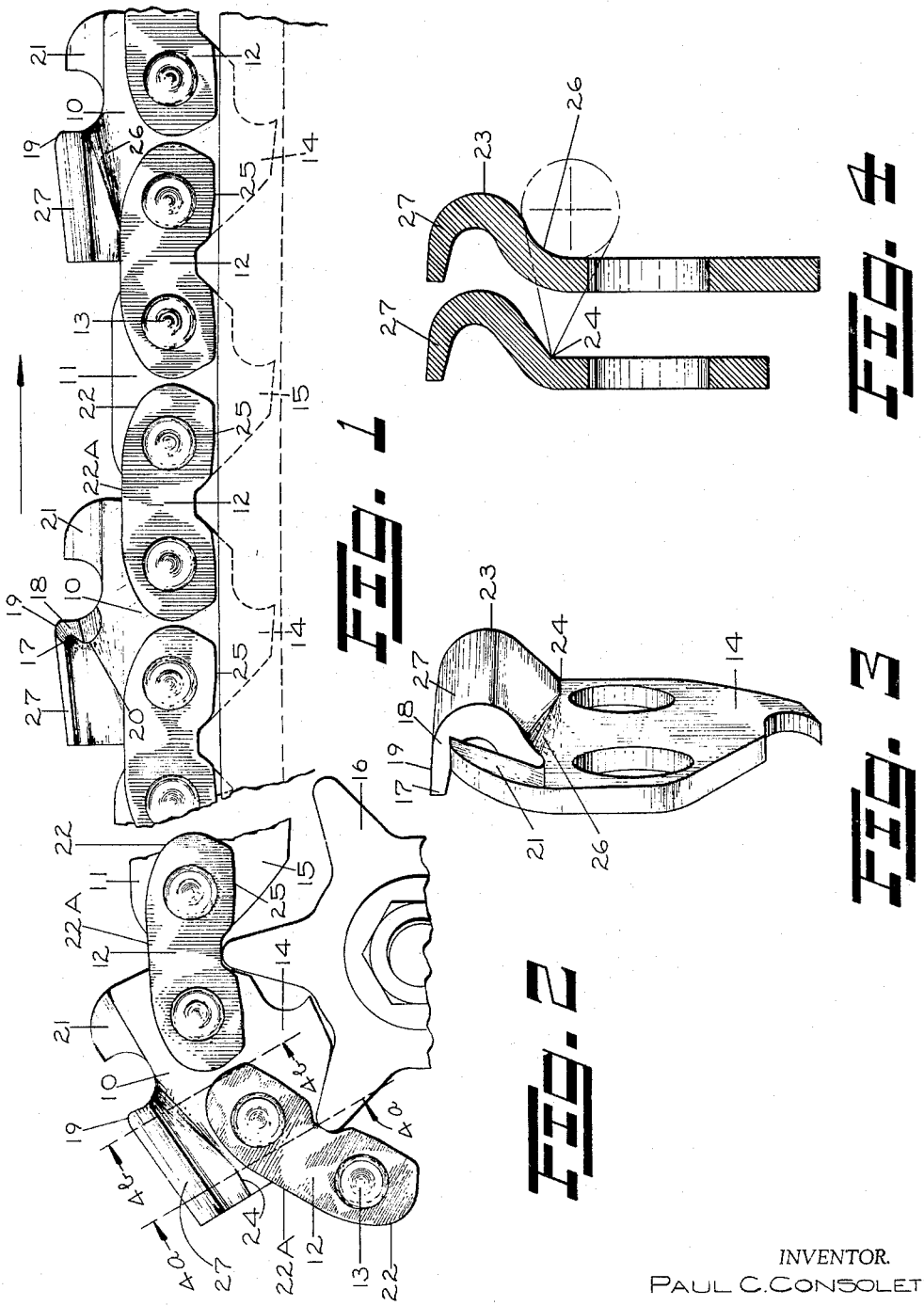
INVENTOR.
PAUL C. CONSOLETTI
BY
ATTORNEY

United States Patent Office

3,167,100
Patented Jan. 26, 1965

3,167,100
SAW CHAIN
Paul C. Consoletti, Milford, Mass., assignor, by mesne assignments, to Omark Industries, Inc., a corporation of Oregon
Filed Oct. 11, 1962, Ser. No. 229,786
3 Claims. (Cl. 143—135)

This invention relates to improvements in saw chains and, more particularly, to means for stabilizing the cutter links making possible a smoother cutting action of the chain.

This application is a continuation-in-part of application Serial No. 103,300, filed on April 17, 1961, now abandoned.

It is a general object of the invention to improve the operating characteristics of saw chains by providing an unvarying cutting action and eliminating the looseness and chattering of cutter links often experienced with chains of conventional design.

A further and more specific object is that of providing the chain with novel connecting and cutter links which cooperate to stabilize the cutter links during the actual cutting operation and to allow free movement of these links as they move around the tip and drive portion of the guide bar.

It is a further object to increase the cutting speed of a saw chain, and particularly of a so-called "center cutter" type of chain wherein the cutter links are centrally mounted in said chain between pairs of side or connecting links and the cutter elements extend outwardly from the pitch line a greater distance than some other chains.

It is a further object to strengthen the cutter link body by allowing lateral flexing in order to obtain a longer service life.

Further objects will become apparent from the following more detailed disclosure.

Saw chains of the type to which the present invention pertains include various links such as cutter links, guide links and connecting links. The cutter links have a cutter element which forms a portion of the link plus a depth gauge which precedes the cutter element for the purpose of limiting the depth to which it may cut into the material being sawed. This type of saw chain and the purpose for which it is intended are well known to those conversant with this art; however, to give a more complete understanding of these various links, their purpose and mode of operation reference is hereby made to United States Patent No. 2,632,484.

In operation, chains of this sort are assembled to travel about the periphery of a chain saw guide bar. The various links comprising the chain, being interconnected by a means including rivets about which said links are articulated, present an unfavorable condition. When operating at normal speeds, the cutter links have a tendency to rock on their connecting rivets and chatter thus reducing efficiency, cutting speed, and smoothness of operation of the chain.

The undesirable results described above can now be overcome by means of the instant invention which provides novel connecting links and cutter links for stabilizing the cutter links as they travel over that portion of the guide bar where the cutting operation is performed.

The novel connecting link, in its relationship to its location on a chain and its position when said chain is assembled on a guide bar, has an outer edge which may be generally convex in shape. Additionally, this outer edge may be provided with a substantially flat outer portion centrally disposed along its length. This flat portion is adapted to stabilize the cutter link as it reaches that portion of the guide bar where the actual sawing operation takes place. Stabilization is accomplished at that point by means of the flat outer edge of the connecting link coming in contact with the inner side of an outwardly and laterally directed cutter element supporting portion of the cutter link which will be further explained.

The novel cutter link is adapted to be assembled in the usual manner of "center cutter" chains, i.e. between pairs of connecting links. The outer forward corner forms a depth gauge to limit the cutting depth during each pass of the cutter link. Rearward of the depth gauge is the curved chisel-shaped cutter element formed as an outwardly and laterally directed supporting portion ending in an outwardly and laterally directed tongue which extends laterally in a direction opposite to the lateral extension of the support portion. The forward edge of this cutting element is the cutting edge when properly filed. The cutting element is shaped so that at the rearward end a contact surface extending angularly to the body of the cutter link is formed for a small portion of its total length. The contact surface will seat against the outer portion of the connecting link and restrain the cutter link from any rocking motion during the cutting cycle.

The angular contact surface formed on the support portion blends into a gradually increasing curve which serves to strengthen the cutter link by allowing for lateral flexing. The curved open area also permits the connecting link to turn on its rivet as the chain rotates around the tip of the blade and the drive sprocket.

The invention will hereinafter be described in greater detail by reference to the accompanying figures of drawing, in which:

FIG. 1 is an elevation of a portion of chain on upper side of bar;

FIG. 2 is similar to FIG. 1 at the drive end of bar;

FIG. 3 is a side view in perspective of a cutter link; and

FIG. 4 shows parallel cross sections taken on lines 4a—4a and 4b—4b in FIG. 2, the section on the left being 4a and that on the right, 4b.

Now referring to the figures of drawing, FIGS. 1 and 2 show a chain of a type to which the instant invention may be applied and is comprised of cutter links 10, guide links 11, connecting or side links 12, and rivets 13 by which all the links are interconnected to form the complete chain. The cutter links 10 and the guide links 11 each include depending drive or guide portions 14 and 15, respectively, by which the chain is compelled to follow a grooved track about the periphery of a guide bar and also through which the chain is driven by its sprocket 16 in a known manner.

Saw chains of this sort are commonly referred to as center cutter chains in that the cutter links 10 as well as the guide links 11 are centrally located with respect to the connecting links by which they are interconnected. Additionally, each cutter link includes a cutter element 17 which terminates at its forward end in a beveled surface 18 providing a sharpened edge 19 and extending rearwardly from the edge 19 as indicated at 20. The cutter links 10 are also each provided with a depth gauge 21 which precedes the cutter element relative to the direction of travel of the cutter link and is of slightly less height so as to limit the depth of cut of said cutter element.

The connecting links 12 which interconnect the cutter links 10 and guide links 11 and which span the distance between the two are of novel design and are assembled with the cutter links by interconnecting means, such as rivets 13, to articulate said links. As shown in FIG. 1, connecting link 12 includes an outer edge surface 22 generally convex in form. Centrally disposed along a part of the length of this edge surface there is provided a substantially flat surface 22A. This surface is adapted to stabilize the cutter link as said link travels across the straight-away portion of the guide bar where the actual cutting operation is performed. Cutter link 10 is stabilized by means of surface 22A coming in contact with the inner side of the outwardly and laterally directed supporting portion 23 which forms an angular contact surface 24 (FIGS. 3 and 4) at the rearward end of cutter link 10. Outwardly and laterally directed supporting portion 23 curves upwardly and reversely to form a laterally directed tongue 27.

During the cutting operation, as pressure is applied to the chain by the bottom surface of the kerf, the depth gauge 21 will force the contact surface 24 of the cutter link 10 to seat against the flat surface 22A. This seating or leveling off of the cutter occurs before the connecting link 12 is forcefully pressed against the bar at the connecting link base 25. No rocking or leveling of the cutter link occurs after the connecting link 12 has contacted the bar, so therefore miscutting or chattering is eliminated.

The angular contact surface 24 (FIG. 3) extends forwardly only a minor portion of the length of support portion 23, but blends into a concave curve 26 of gradually increasing radius forwardly of the cutting element as seen in FIG. 4. By extending the angular surface 24 only a portion of the full length of cutter element 17, the part is strengthened and its life greatly extended as lateral flexing is now possible. As the chain travels around the tip of the guide bar and also the drive sprocket, the various links are permitted to rotate on their connecting joints and contact is lost between surface 22A and the angular surface 24 thus allowing the chain to travel completely about the periphery of the guide bar free from binding or interference.

The chain is formed from cutter links 10 and center links 11 placed alternately and interconnected by opposing pairs of connecting links 12 fastened by rivets 13.

In operation, a saw chain is compelled to follow a grooved track about the periphery of a guide bar by means of the guide portions 14 and 15 of the cutter and guide links. The cutter links during their travel along the straightaway portion of the guide bar, where the actual cutting operation is performed, are stabilized by means of surface 22A of that connecting link 12 which trails the cutter link on the side having the angular surface 24. The preceding cutter link is stabilized on the opposite side of the chain since the plurality of routers necessary for a given length of chain are assembled in an allochiral manner.

Supporting or stabilizing the cutter links in the manner herein described has improved the operating characteristics of the saw chain as well as the cutting efficiency. By the elimination of the chattering, each cutter is enabled to remove its full cut with each revolution of the chain.

While FIGS. 1 and 2 illustrate all of the connecting links 12 as having the novel raised upper edge 22A, it will be readily seen that only every fourth one on each side acts to accomplish the purpose of the instant invention. The other three on each side act only as connecting links in the usual well-known manner.

Comparisons made by means of high-speed photography have shown that chains equipped with links of the instant invention, through their stabilizing effect, allow more cutting links to enter the actual cutting operation and to nearly double the cutting speed of similar chain operating under identical conditions, but with regular connecting and cutter links.

While one embodiment of the invention has been disclosed, it is to be understood that the inventive concept may be carried out in a number of ways. This invention is, therefore, not to be limited to the precise details described, but is intended to embrace all variations and modifications thereof falling within the spirit of the invention and the scope of the claims.

I claim:
1. A saw chain comprising allochiral cutter links and connecting side links, said cutter links each having a body portion extending between and pivotally connected adjacent the rear of said body portion to a rearwardly extending pair of side links, each of said cutter links having a cutter element thereon including an outwardly and laterally extending support portion terminating in a tongue portion extending laterally in a direction opposite to the lateral extension of said support portion, said support portion for a minor part of its length adjacent its rearward end defining a contact surface extending angularly with respect to said body portion, said contact surface blending in a forward direction and for the remaining major part of the length of said support portion into a curved surface of gradually increasing radius, said contact surface engaging the outer edge surface of one link of said rearward pair of side connecting links before said one link is in full engagement with an associated guide bar for the chain.

2. A cutter link for a saw chain comprising a body portion having thereon a depending drive and guide portion, a forwardly positioned outwardly extending depth gauge, and an outwardly directed cutter element spaced rearwardly from said depth gauge, said cutter element having an outwardly and laterally extending support portion terminating in a tongue portion extending laterally in a direction opposite to the lateral extension of said support portion, said support portion for a minor part of its length adjacent its rearward end defining a surface extending angularly with respect to said body portion, said surface blending in a forward direction and for the remaining major part of the length of said support portion into a curved surface of gradually increasing radius.

3. A saw chain comprising allochiral cutter links and connecting side links, said cutter links each having a body portion extending between and pivotally connected adjacent the rear of said body portion to a rearwardly extending pair of side links, each of said cutter links having a cutter element thereon including an outwardly and laterally extending support portion terminating in a tongue portion etxending laterally in a direction opposite to the lateral extension of said support portion, said support portion for a minor part of its length adjacent its rearward end defining a contact surface extending angularly with respect to said body portion, said contact surface blending in a forward direction and for the remaining major part of the length of said support portion into a curved surface of gradually increasing radius, said contact surface engaging the outer edge surface of one link of said rearward pair of side connecting links before said one link is in full engagement with an associated guide bar for the chain, said one connecting link having a generally convex outer edge surface providing a central portion positioned outwardly of adjacent portions of said edge surface for engagement with said contact surface.

References Cited in the file of this patent
UNITED STATES PATENTS

| | | |
|---|---|---|
| 2,658,537 | Ackley | Nov. 10, 1953 |
| 2,854,041 | Siverson | Sept. 30, 1958 |
| 2,976,900 | Mills | Mar. 28, 1961 |